United States Patent [19]

Almdahl et al.

[11] 4,308,101
[45] Dec. 29, 1981

[54] FIXING MEANS FOR A SUBSTANTIALLY CYLINDRICAL NUCLEAR REACTOR PRESSURE VESSEL WITH A VERTICAL AXIS

[75] Inventors: Per Almdahl, Oslo, Norway; Bo Borrman; Lennart Gillander, both of Vesterås, Sweden; Roland Larsson, Hägersten; John-Evert Steger, Vesterås, both of Sweden

[73] Assignee: AB Asea-Atom, Sweden

[21] Appl. No.: 46,977

[22] Filed: Jun. 8, 1979

[51] Int. Cl.³ .............................................. G21C 11/02
[52] U.S. Cl. .................................... 376/461; 376/285; 376/293; 376/296
[58] Field of Search .................. 176/38, 87; 52/223 R, 52/224

[56] References Cited

U.S. PATENT DOCUMENTS

| | | | |
|---|---|---|---|
| 3,103,026 | 9/1963 | Hahn | 52/223 R |
| 3,289,366 | 12/1966 | Abrams | 52/224 |
| 3,398,493 | 8/1968 | Massey | 176/87 |
| 3,445,971 | 5/1969 | Desmarchais | 52/224 |
| 3,578,564 | 5/1971 | Fletcher | 176/38 |
| 3,633,784 | 11/1972 | Taft | 176/87 |
| 3,753,853 | 8/1973 | Schabert | 176/38 |
| 3,775,251 | 11/1973 | Schabert | 176/38 |
| 3,963,565 | 6/1976 | Beine | 176/38 |
| 4,036,700 | 7/1977 | Dorner | 176/38 |
| 4,047,632 | 9/1977 | Schilling | 176/87 |

FOREIGN PATENT DOCUMENTS

| | | | |
|---|---|---|---|
| 539598 | 4/1957 | Canada | 52/223 R |
| 2614821 | 10/1977 | Fed. Rep. of Germany | 52/225 |
| 1247148 | 9/1971 | United Kingdom . | |

OTHER PUBLICATIONS

[CRBRP]: Proposed Reference Design for the Clinch River Breeder Reactor Plant, Proceedings of the Reactor Corporation, Oct. 1974 Information Session, PMC-74-01; conf.-74 1087, pp. 20-24.

Primary Examiner—Harvey E. Behrend
Assistant Examiner—Edward F. Miles
Attorney, Agent, or Firm—Pollock, Vande Sande & Priddy

[57] ABSTRACT

The present invention relates to an improved attachment assembly for clamping a nuclear reactor foot ring into engagement with a surrounding support wall while allowing for thermal expansion of the foot ring.

19 Claims, 3 Drawing Figures

FIXING MEANS FOR A SUBSTANTIALLY CYLINDRICAL NUCLEAR REACTOR PRESSURE VESSEL WITH A VERTICAL AXIS

BACKGROUND ART

A reactor furnished with fixing or attachment means of the kind mentioned above is known from British Pat. No. 1,247,148. In the known reactor the members which transmit the tensile force are fixed directly to the foot ring of the reactor vessel, which means that the vertical members transmitting the tensile force run through the radiation protection device with a relatively small radial distance from the radially inner limiting surface of said radiation protection device. The prestressing force exerted on the concrete by said members are thus unevenly distributed over the cross section of the radiation protection device and less efficient from the point of view of strength than an evenly distributed prestressing force.

Furthermore, the known construction involves the disadvantage that the prestressed tensile-force transmitting members are easily subjected to shearing forces caused by the thermal expansion of the foot ring.

SUMMARY OF THE INVENTION

The above-mentioned drawbacks are eliminated with a reactor and attachment designed according to the invention.

The design employed in the present invention makes possible an unusually strong attachment of the foot ring of the pressure vessel, which efficiently counteracts tilting of the pressure vessel if the supporting building structure should be subjected to vibrations, for example in connection with an earthquake.

The particular characteristics of the present invention is clear from the appended claims.

BRIEF DESCRIPTION OF DRAWINGS

In the following the invention will be described with reference to the accompanying schematic drawings, in which

FIG. 2 shows an embodiment of a nuclear reactor according to the invention in partial axial section along II—II of FIG. 3, whereas

DETAILED DESCRIPTION OF PREFERRED EMBODIMENT

Figure 1:
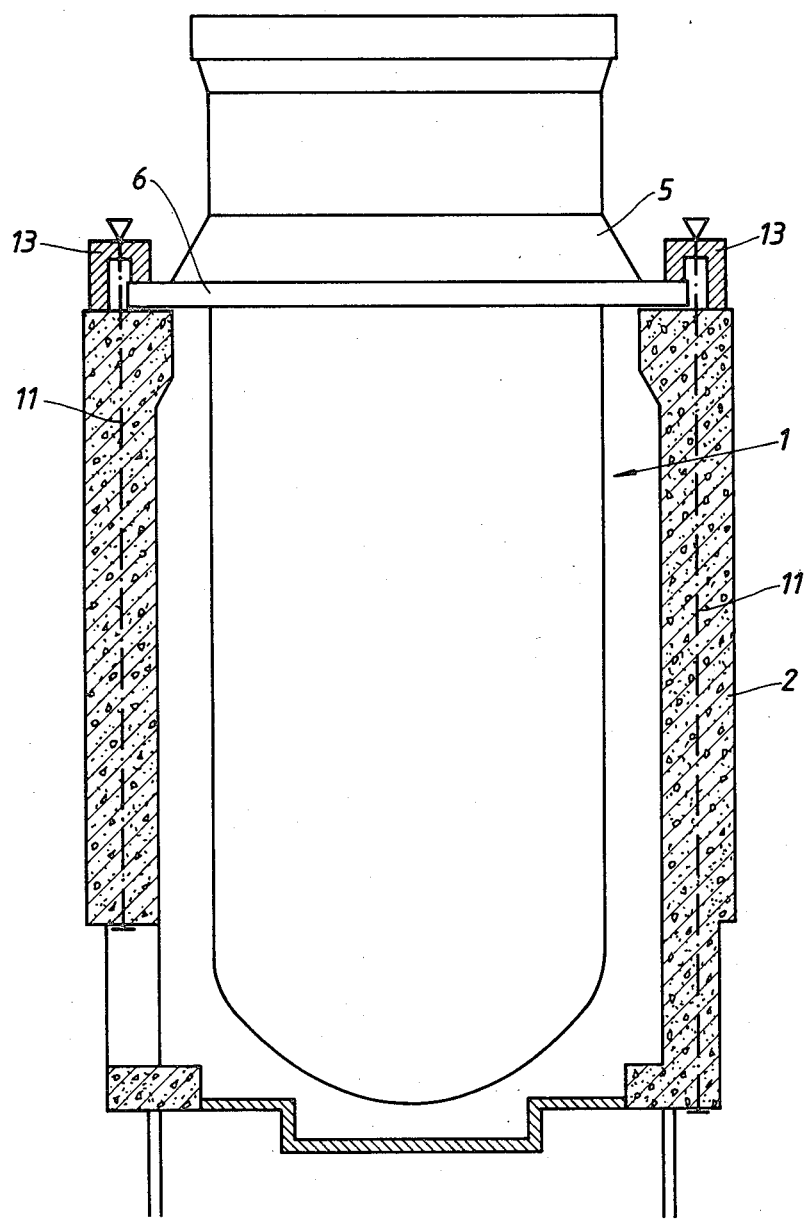
FIG. 1 is an outline sketch roughly showing a side view of a reactor vessel according to the invention, whereas a radiation protection device surrounding the reactor vessel is shown in vertical section.

In the drawings, 1 designates a pressure vessel in a nuclear reactor and 2 designates a substantially hollow-cylindrical radiation protection device which is made of concrete and which surrounds the pressure vessel 1. The biological shield 2 has a horizontal supporting surface 3 formed from a plurality of metallic bearing plates 4 which are cast integral with the radiation protection.

Figure 2:
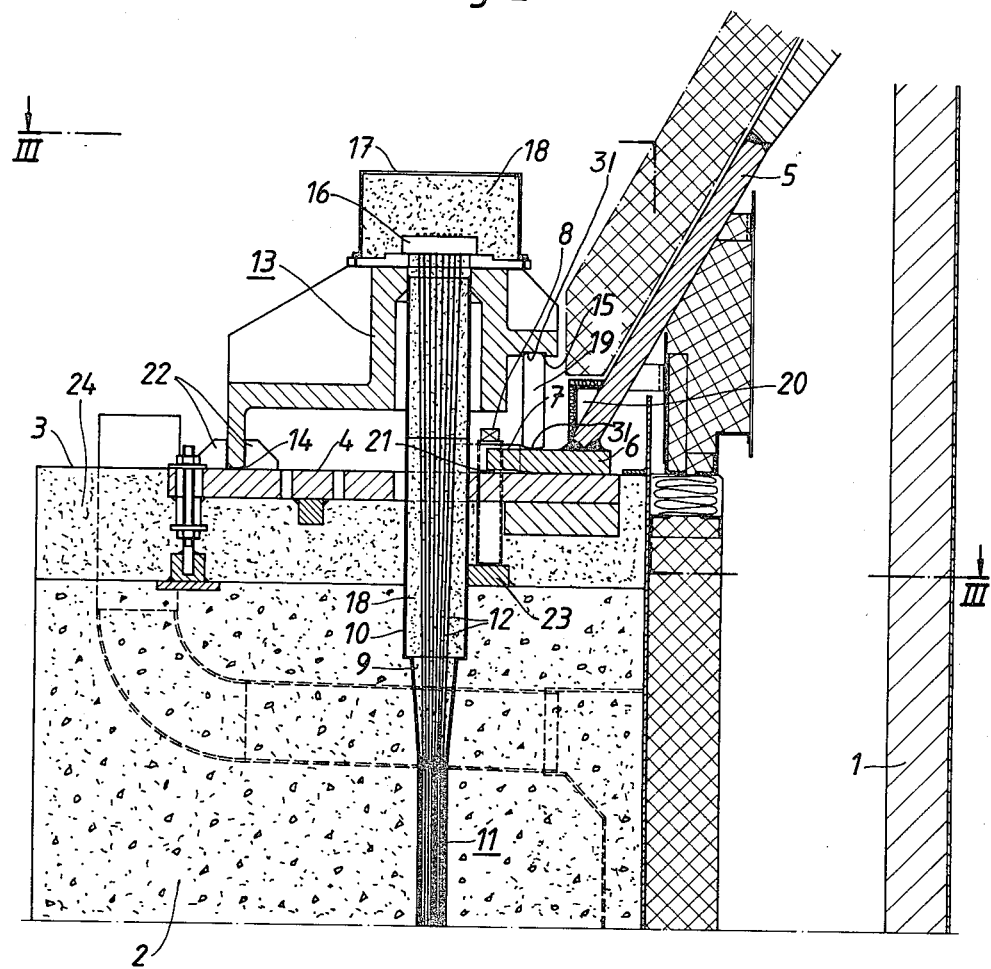
Figure 3:
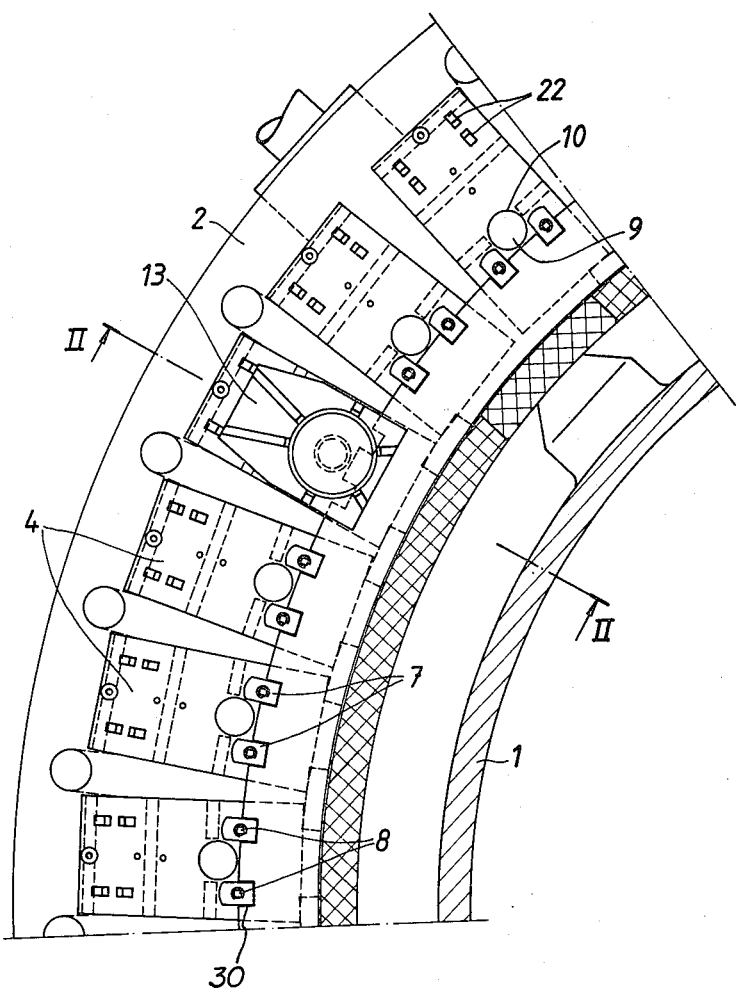
FIG. 3 shows a sector of the reactor vessel and the radiation protection device, partly in vertical view, partly in horizontal section along the line III—III of FIG. 2.

The reactor vessel 1 is supported by a truncated sheet metal cone 5, which is welded to the reactor vessel 1 at its upper end. The lower end of the sheet metal cone is provided with a foot ring 6 welded to it, said foot ring resting against the bearing plates 4. A plurality of blocking members 7 protruding from the supporting surface, which are mainly designed to take up horizontal forces, are arranged to make mechanical contact with radially outwardly facing surfaces of recesses 30 of the foot ring 6, even when the temperature of the foot ring is lower than the temperature at which the temperature increase of the foot ring amounts to 25% of its maximum value, preferably even at room temperature. Two blocking members 7 are welded to each bearing plate 4 and are each run through by a bolt 8 screwed to the member, the lower end of said bolt resting on a plate 23 cast into the concrete and supporting the reactor vessel before the foundation 24 below the bearing plate 4 has been cast. Some of the blocking members are inserted into these recesses with no mentionable clearance, thus giving a locking effect in the tangential direction as well. The biological shield 2 is formed with a plurality of vertical channels 9, each of which is defined by means of a thin-walled lining tube 10. Each channel 9 contains a tensile force transmitting member in the form of a bundle 11 of prestressed steel rods. With their lower ends the steel rods 12 of a bundle 11 are fixed to the lower end of the biological shield 2, and with their upper ends they are fixed to the mid-portion of a yoke 13, which has a radially outer force-transmitting surface 14 making contact with one of the bearing plates 4, and a radially inner force-transmitting surface 15 facing the foot ring 6. Steel wires can be used instead of steel rods. The steel rods 12 are individually attached to a fixing member 16 supported by the yoke 13. The fixing member 16 is surrounded by a casing 17 which, similar to the tube 10, is filled with solidified cement paste 18, which constitutes corrosion protection for the steel rods 12. From the force-transmitting surface 15 of the yoke 13 a compressive force is transmitted to the foot ring via two swivelling castors 19, which include circular-cylindrical contact surfaces 31 arranged in a pressure-transmitting connection with plane surfaces of the yoke 13 and the foot ring 6. In FIG. 2 the axis of rotation of the swivelling castor is perpendicular to the paper plane. The truncated sheet metal cone 5 is provided at its lower end with a circular cooling channel 20, by means of which it is prevented that the temperature of the foot ring becomes so high that the concrete in the radiation protection device may become damaged, and also that the temperature expansion forces from the foot ring and the sheet metal cone becomes too high.

When the reactor vessel is hot, the sheet metal cone 5 and the foot ring 6 tend to expand. Since thermal expansion of the foot ring is prevented by means of the blocking members 7, the heating results in the inner edge of the foot ring 6 being lifted somewhat from the bearing plates 4. The lower side of the foot ring is turned off in such a way that it forms a curved surface extending from points exactly below the swivelling castor 19 and approximately halfway to the outer edge of the foot ring, where the curved surface changes into a plane surface which limits a gap 21 between the foot ring 6 and the bearing plate 4. This means that the shown cross section of the foot ring, upon said lifting at the inner edge, turns about a narrow bearing zone located in the above-mentioned curved surface exactly below the swivelling castor 19. The deformations that take place at varying temperature of the sheet metal cone 5 are thus not counteracted, or only to a minor degree, by the tensioning force which is transmitted to the foot ring 6 via the yoke 13 and the swivelling castor 19, and for the same reason a lifting of the inner edge of the foot ring may take place without causing any mentionable lifting of the yoke 13.

The yoke 13 is locked in the radial direction by means of four guiding protrusions 22, which are welded to a corresponding bearing plate 4. The fact that the only mechanical connection between the yoke 13 and the foot ring 6 consists of swivelling castors means that no horizontal force component can be transmitted from the foot ring 6 to the yoke 13. By avoiding a radial movement of the yoke there is no risk of cracks arising in the rust-protecting cement enclosure of the bundle 11 by the bundle being subjected to bending stress.

Instead of using cement as corrosion protection for the bundle 11, an elastic material, for example plastic, may be used. In that case it is not equally necessary to avoid a horizontal movement of the yoke 13, and the swivelling castor 19 can be replaced with another member transmitting compressive forces.

We claim:

1. In combination with a substantially cylindrical nuclear reactor pressure vessel and a concrete support wall surrounding said pressure vessel, an attachment assembly for fixedly mounting said pressure vessel comprising:
    a support member having a first end portion attached to said pressure vessel and having a second, opposite end portion positioned proximate to a support surface of said support wall;
    a foot ring fixedly attached to said second end portion of said support member, with said foot ring overlapping and contacting a portion of said support surface of said support wall;
    a plurality of elongated prestressed tensile force transmitting members each including a first end portion fixedly positioned in a vertically lower end portion of said support wall and each elongated tensile force transmitting member further including a second, opposite end portion extending beyond said support surface of said support wall;
    a plurality of separate yoke assemblies positioned adjacent said support surface with each yoke assembly enclosing the second end portion of at least one of said elongated, prestressed tensile force transmitting members;
    attachment plate means mounted within each of said yoke assemblies for fixedly attaching said second end portion of said at least one tensile force transmitting member to said respective yoke assembly whereby said tensile force transmitting members draw said yoke assemblies toward said support surface;
    each yoke assembly having a radially outer force-transmitting surface contacting said support surface at a location radially outside said foot ring, and
    clamping means in force transmitting relationship with said elongated prestressed tensile force transmitting members and said foot ring for pressing said foot ring against said support surface.

2. The combination according to claim 1, wherein said support member has a substantially truncated cone configuration and is formed of a sheet metal material.

3. The combination according to claim 1, wherein said foot ring is substantially cylindrical in cross-sectional configuration and includes a radial outward edge surface facing away from said pressure vessel.

4. The combination according to claim 3, wherein a plurality of separate metallic bearing plates are each embedded within the support surface of said support wall, with portions of each of the bearing plates contacting the overlapping portion of said foot ring to provide support therefor.

5. The combination according to claim 4, wherein said radial outward edge surface of said foot ring includes a plurality of recesses extending through portions thereof, with said recesses circumferentially spaced about the outward edge surface of said foot ring, and a plurality of spaced block members are each fixedly attached to said bearing plates, with said blocking members each partially extending into one of the recesses formed in said foot ring to limit movement of said foot ring along the support surface in a direction radially away from said pressure vessel.

6. The combination according to claim 1, wherein a cooling conduit is fixedly mounted on the second end portion of said support member adjacent to said foot ring.

7. The combination according to claim 1, wherein said plurality of elongated tensile force transmitting members each comprises a prestressed steel rod.

8. The combination according to claim 7, wherein a plurality of said prestressed rods are grouped into a plurality of bundles with each bundle extending through a thin-walled substantially vertically extending tubular passageway formed through said support wall, with each bundle of prestressed rods spaced from one another and each bundle of prestressed rods partially enclosed by a separate yoke assembly.

9. The combination according to claim 8, wherein said attachment plate means comprises a separate attachment plate fixedly mounted within each of said yoke assemblies, with each attachment plate having a plurality of apertures extending therethrough, and
    each of said apertures positioned to receive one of said prestressed rods extending therethrough.

10. The combination according to claim 8, wherein a hollow cap member surrounds an end portion of each yoke assembly and a corrosion protecting compound fills the space formed between said cap and said yoke assembly to protect the second end portions of said tensile transmitting members enclosed within said plurality of yoke assemblies,
    and a further quantity of said corrosion protecting compound is positioned within each of said thin walled tubular passageways.

11. The combination according to claim 1, wherein a side wall of said foot ring includes a surface portion curved away from a confronting portion of said support surface of said support wall to allow said foot ring to pivot relative to said support surface.

12. The combination according to claim 11, wherein said curved surface portion of said foot ring is positioned vertically beneath said force transmitting means.

13. In combination with a substantially cylindrically shaped nuclear reactor vessel, and a support wall surrounding said reactor vessel, an attachment assembly for positioning said nuclear reactor vessel within said support wall, said attachment assembly comprising a support surface on said support wall, a foot ring rigidly connected to the circumference of said reactor vessel and in contact with said support surface, and fixing means, said fixing means comprising:
    a plurality of elongated prestressed tensile force transmitting members each including a first end portion fixedly positioned in a vertically lower end portion of said support wall;

a plurality of yokes each supported on said support surface, each yoke having a radially-outer surface in force transmitting connection with said support surface and a radially-inner surface in force transmitting connection with a portion of said foot ring, each yoke further having a mid-portion joining said radial outer and inner surfaces and mechanically connected to an upper end of at least one of said tensile force transmitting members; and, said fixing means further comprising blocking means fixed to the support wall and projecting from the portion of said support surface adjacent a radially outwardly facing surface of said foot ring for limiting moving of said foot ring along said support surface in a direction away from said nuclear reactor pressure vessel.

14. An attachment assembly according to claim 13, wherein said blocking means comprises a plurality of separate blocking members extending from said support surface at predetermined locations adjacent said outwardly facing surface of said foot ring, with a plurality of said blocking members initially contacting said foot ring prior to operation of said nuclear reactor vessel.

15. The combination according to claim 13, wherein a plurality of elongated prestressed tensile force transmitting members are arranged in a plurality of channels each extending in a substantially vertical direction through said support wall.

16. The combination according to claim 15 wherein a corrosion protecting compound is introduced into each of said channels for protecting the elongated prestressed tensile force transmitting members extending through said channels, wherein said tensile force transmitting members and said compound fill said channels.

17. The combination according to claim 13, wherein said elongated prestressed tensile force transmitting members each comprises a prestressed steel rod.

18. The combination according to claim 13, wherein a swivelling caster is clamped between the radially inner surface of each yoke assembly and a portion of said foot ring for pressing said foot ring against said support surface while allowing thermal expansion of said foot ring.

19. The combination according to claim 1, wherein said clamping means comprises a plurality of separate swivelling casters, with each caster having a circular-cylindrical contact surface contacting both a radially inner surface of one of said yoke members and a portion of said foot ring.

* * * * *

UNITED STATES PATENT AND TRADEMARK OFFICE
CERTIFICATE OF CORRECTION

PATENT NO. : 4,308,101

DATED : December 29, 1981

INVENTOR(S) : Per Almdahl, Bo Borrman, Lennart Willander, Roland Larsson, and John-Evert Steger It is certified that error appears in the above-identified patent and that said Letters Patent are hereby corrected as shown below:

On the title page insert

--(30) Foreign Application Priority Data

June 8, 1978 Sweden. . . . . . . . . . . . . . 7806666 --

Signed and Sealed this

Twenty-seventh Day of April 1982

[SEAL]

Attest:

GERALD J. MOSSINGHOFF

Attesting Officer

Commissioner of Patents and Trademarks